United States Patent
Adamic et al.

(10) Patent No.: US 9,963,608 B2
(45) Date of Patent: May 8, 2018

(54) NON-NEWTONIAN INKJET INK

(71) Applicant: Hewlett-Packard Development Company, L.P., Fort Collins, CO (US)

(72) Inventors: Raymond Adamic, Corvallis, OR (US); Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/519,368

(22) PCT Filed: Oct. 20, 2014

(86) PCT No.: PCT/US2014/061321
§ 371 (c)(1),
(2) Date: Apr. 14, 2017

(87) PCT Pub. No.: WO2016/064371
PCT Pub. Date: Apr. 28, 2016

(65) Prior Publication Data
US 2017/0247559 A1    Aug. 31, 2017

(51) Int. Cl.
*C09D 11/38* (2014.01)
*C09D 11/033* (2014.01)
*C09D 11/322* (2014.01)
*B41J 2/175* (2006.01)

(52) U.S. Cl.
CPC ........... *C09D 11/38* (2013.01); *B41J 2/17553* (2013.01); *C09D 11/033* (2013.01); *C09D 11/322* (2013.01)

(58) Field of Classification Search
CPC .... B41J 2/17553; C09D 11/38; C09D 11/033; C09D 11/322

USPC .......................................................... 347/86
See application file for complete search history.

(56) References Cited

U.S. PATENT DOCUMENTS

| | | | |
|---|---|---|---|
| 5,973,036 A | 10/1999 | Matzinger et al. | |
| 6,277,183 B1 * | 8/2001 | Johnson ................ | C09D 11/38 106/31.27 |
| 7,368,487 B2 * | 5/2008 | Wu ........................ | C09D 11/30 523/160 |
| 7,441,976 B2 | 10/2008 | Kitaoka et al. | |
| 2002/0149659 A1 | 10/2002 | Wu et al. | |
| 2003/0041777 A1 * | 3/2003 | Karl ..................... | C09D 11/322 106/31.65 |
| 2005/0126414 A1 | 6/2005 | Weiss et al. | |
| 2005/0143486 A1 | 6/2005 | Yoshimura et al. | |

(Continued)

FOREIGN PATENT DOCUMENTS

JP      2012177063      9/2012

OTHER PUBLICATIONS

International Search Report dated Nov. 4, 2015 for PCT/US2014/061321, Applicant Hewlett-Packard Development Company, L.P.

*Primary Examiner* — Huan Tran
*Assistant Examiner* — Alexander D Shenderov
(74) *Attorney, Agent, or Firm* — Thorpe, North & Western L.L.P.

(57) ABSTRACT

The present disclosure provides non-Newtonian inkjet inks and related methods. In one example, a non-Newtonian inkjet ink can comprise silica, alumina, and organic solvent. The non-Newtonian inkjet ink can be an aqueous ink having a pH from 9 to 12 and a conductivity from 100 to 2000 µS/cm.

15 Claims, 2 Drawing Sheets

(56) References Cited

U.S. PATENT DOCUMENTS

| | | | |
|---|---|---|---|
| 2006/0056009 A1* | 3/2006 | Kornbrekke | B01F 17/0085 359/296 |
| 2006/0089442 A1* | 4/2006 | Mennig | B82Y 30/00 524/430 |
| 2006/0099529 A1* | 5/2006 | Tanaka | G03G 9/0804 430/137.14 |
| 2007/0043144 A1 | 2/2007 | House et al. | |
| 2007/0218380 A1 | 9/2007 | Uchinokura et al. | |
| 2009/0163615 A1 | 6/2009 | Halahmi et al. | |
| 2010/0209841 A1 | 8/2010 | Uchinokura et al. | |
| 2010/0304028 A1 | 12/2010 | Sowinski et al. | |
| 2011/0003244 A1 | 1/2011 | Inoue et al. | |
| 2011/0076404 A1* | 3/2011 | Brust | C09D 11/322 427/256 |
| 2013/0022371 A1 | 1/2013 | Kusahara et al. | |

* cited by examiner

NON-NEWTONIAN INKJET INK

BACKGROUND

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs much lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. Inks normally used in ink-jet recording are commonly composed of water-soluble organic solvents (humectants, etc.), surfactants, and colorants, typically in a predominantly aqueous fluid. When a recording is made on "plain paper," the deposited colorants retain some mobility, which can be manifest in poor bleed, edge acuity, feathering, and inferior optical density/chroma (due to penetration on the paper). These features adversely impact text and image quality. Some systems include using a coated paper or coating the paper immediately before printing with the inkjet ink. Such coatings generally contain various components such as fixers to reduce colorant mobility. However, such systems can be costly, can lower print quality, and/or can be limiting as the media is typically matched to the inks.

BRIEF DESCRIPTION OF THE DRAWINGS

Additional features and advantages of the disclosure will be apparent from the detailed description which follows, taken in conjunction with the accompanying drawings, which together illustrate, by way of example, features of the technology; and, wherein.

Figure 1:
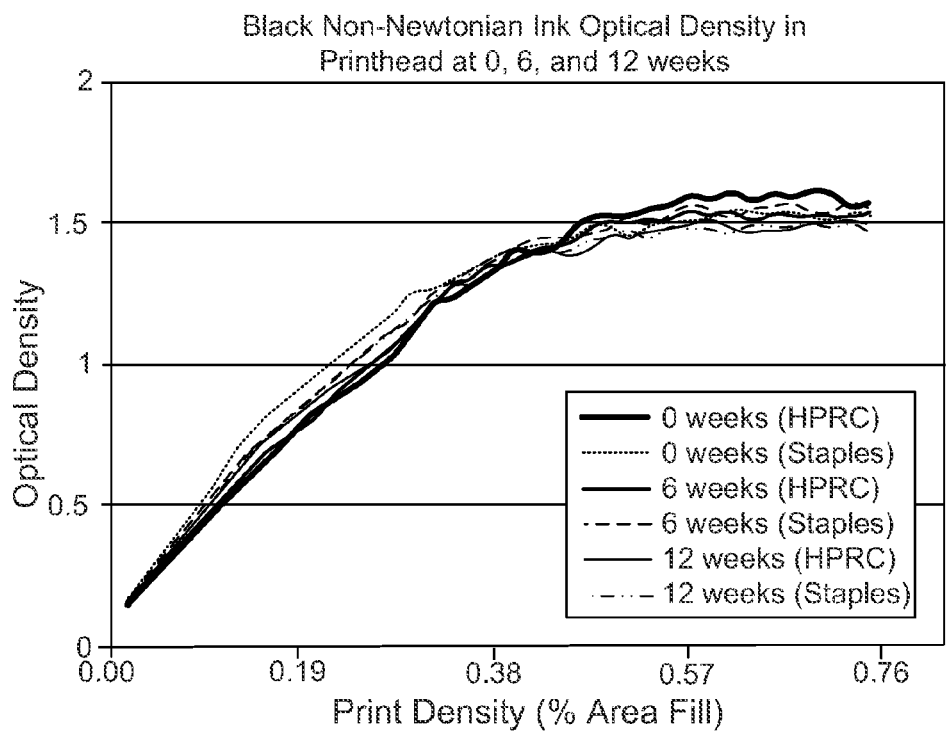
FIG. 1 is a graph depicting the storage stability illustrated by measured optical density on two different types of media at 0, 6, and 12 weeks in accordance with examples of the present disclosure.

Reference will now be made to certain examples illustrated, and specific language will be used herein to describe the same. It will nevertheless be understood that no limitation of the scope of the disclosure is thereby intended.

DETAILED DESCRIPTION

In accordance with the present technology, non-Newtonian inkjet inks can be prepared where the viscosity of the inks can be manipulated by physical forces allowing for printing of the inks via inkjet technologies while achieving improved viscosity upon printing. Notably, the reformation of a structured network after printing can allow for the present non-Newtonian inkjet inks to often provide better optical density than achieved by traditional Newtonian inkjet inks. Furthermore, these inks surprisingly exhibit a relatively long shelf life because they exhibit lowered phase separation compared to other similarly formulated inks. Essentially, the non-Newtonian nature of the inkjet inks of the present disclosure provide highly structured inks that can exhibit desirable optical density or color saturation, while the charge balance between various solids within the ink can facilitate enhanced storage stability over time, e.g., reduced phase separation.

These properties can be quantified or characterized indirectly in various ways, including through dynamic viscosity at various shear rates (e.g., viscosity can be measured to indirectly show network formation or aggregation in the ink), though pH relative to the isoelectric point of one of the ink solids (e.g., pH at or above the isoelectric point of alumina can provide a desirable balance of charge density), and/or through conductivity of the ink (e.g., conductivity from 100 to 2000 µS/cm facilitates enhanced stability over inks with higher conductivity). As an illustration of improvement, if a salt were to be used to shield other particles within the ink instead of alumina, structured inks can still be formed that have acceptable viscosities, but due to generally higher conductivities inherent with adding appropriate concentrations of salt to achieve this effect, e.g., greater than about 3000 µS/cm, these inks tend to be less stable over time and may undergo unwanted phase separation. In accordance with examples of the present disclosure, minimizing phase separation and/or aggregation in a bulk ink and reliably printing that ink on paper can lead to several desirable properties. For example, when the ink hits the paper, water and solvent absorption occurs and the pH typically drops. The resulting particle enrichment creates an environment that causes the colorant to stay on the surface more effectively via aggregation. Thus, improved optical density can be achieved compared to many other types of inks.

Thus, examples described herein are directed to non-Newtonian inkjet inks that are useful in standard inkjet printing systems. The present non-Newtonian inkjet inks can be inkjet printed as the viscosity of the non-Newtonian inkjet inks can be lowered using shear or thermal forces within an inkjet printhead. Once exiting the printhead, the viscosity of the present non-Newtonian inkjet inks rapidly increases (e.g. with 5 seconds or within 30 seconds) via self-assembly of a structured network within the non-Newtonian inkjet inks. Generally, the structured network within the non-Newtonian inkjet inks can be assembled through interaction between the silica and alumina, in some instances, other charged particles.

It is noted that when discussing the present compositions, inkjet print cartridges, methods, etc., each of these discussions can be considered applicable to each of these examples, whether or not they are explicitly discussed in the context of that example. Thus, for example, in discussing a silica used in a non-Newtonian inkjet ink, such a silica can also be used in a method of manufacturing a non-Newtonian inkjet ink, and vice versa.

It is also noted that when referring to an "ink" or an "inkjet ink," this does not infer that a colorant necessarily be present. Inks, as defined herein, can be colorant free or can alternatively include colorant.

Generally, recording media and/or inkjet inks can have a variety of additives and coatings to provide acceptable quality when used in printing applications. However, utilizing the present non-Newtonian inkjet inks can eliminate the need for some layers, can eliminate costly additives, and/or can eliminate the amounts of materials needed in the media sheets/inks.

With the above in mind, a non-Newtonian inkjet ink can comprise silica in an amount ranging from 0.1% to 10% by weight based on the total weight of the non-Newtonian inkjet ink; alumina in an amount from 0.25% to 5% by weight based on the total weight of the non-Newtonian inkjet ink; and organic solvent in an amount from 5% to 50% by weight based on the total weight of the non-Newtonian inkjet ink. In this and other examples, the non-Newtonian inkjet ink can be an aqueous ink having a pH from 9 to 12 and a conductivity from 100 to 2000 µS/cm.

With this arrangement, in one example, the silica can form a structured network in the presence of the alumina, and the inkjet ink can have a dynamic viscosity ranging from 25 cps to 10,000 cps at shear rate of 5 $s^{-1}$ and a dynamic viscosity ranging from 1 cps to 50 cps at a shear rate of 10,000 $s^{-1}$, measured at 25° C. At an even higher shear rate range (>50,000-100,000 $s^{-1}$) dynamic viscosity of the inks can drop further, e.g. from 1 to 10 cps. As such, high shear rates or other mechanical or thermal forces can enable reliable jetting from inkjet printheads. Such viscosities can be measured using an Anton Paar Rheometer or a CAP2000 Rheometer from Brookfield Instruments, and can be measured by shearing at room temperature (25° C.). Notably, the addition of heat with shear can alter, e.g. lower, the viscosity profiles of the present inks. It is noted that in one specific example, the inkjet ink can be an aqueous inkjet ink, comprising a water content from 30% to 95% by weight.

In accordance with examples of the present disclosure, silica and alumina co-dispersions as described herein can be useful in that the alumina has a relatively small charge density and the charge is sensitive to the pH of the ink. When the pH of the ink is close to the isoelectric point or point of zero charge of the alumina, the amount of charge on the alumina particles is likewise at or near zero. As a result, a desirable balance of charge density and holding this zero charge effect to a minimum can be achieved by utilizing a silica based dispersion and the relatively low charge density alumina dispersions together in the non-Newtonian inkjet ink. This combination results in improved (lower) aqueous phase separation while maintaining good colorant holdout compared to non-Newtonian inks with high charge density particles or salts. However, the alumina also is included in the inkjet ink at a concentration so that it is of a sufficient strength to affect a positive influence on the networking ability of the non-Newtonian inkjet inks of the present disclosure.

To illustrate by example, the pH of the non-Newtonian inkjet ink can be from 9 to 12. In one example, the pH can be from 9.5 to 11 or from 9.5 to 10.5, giving the alumina a negative charge that helps maintain a stable ink with other anionically charged metal or semi-metal species that may be present. Furthermore, the inkjet ink can be formulated so that the pH may in some cases drop at or below the isoelectric point of the alumina when printed on plain paper (or on a more neutral substrate), and thus, the negative charge becomes neutral or even positive. As a note, due to water evaporation, absorption, and/or concentration enrichment, the pH may actually not need to drop much to trigger a strong attraction interaction due to van der Waals interactions. Thus, in some cases, a drop in pH, even if not at or below the isoelectric point of the alumina can still have a positive effect.

In another example, the non-Newtonian inkjet inks of the present disclosure can be very stable over time, and this stability can be attributed in part to their relatively low conductivity levels. As mentioned, the inks can have a conductivity ranging from 100 to 2000 micro Siemens per centimeter (µS/cm). Lower conductivities within this range can improve stability on the one hand, but higher concentrations of alumina may improve the charge balance on the other hand, though higher concentrations may also raise the conductivity level within the ink. Thus, other more specific ranges of conductivity that can be selected for formulating the inks of the present disclosure can be from 100 to 1000 µS/cm or from 500 to 1000 µS/cm, for example.

As used herein, "structured network" refers to the three dimensional structure formed by the silica particles in the presence of the alumina via electrostatic interactions and/or physical interactions in the non-Newtonian inkjet ink, wherein the three dimensional structure is dependent upon mechanical and/or thermal forces. Such mechanical and/or thermal forces, such as shear energy or heat energy, weaken the structured network resulting in the viscosity changes based on the amount of force applied, as discussed herein. In one example, the structured network can be free of polymers in that the three dimensional structure does not comprise polymers. However, such an example does not preclude polymers to be present within the non-Newtonian inkjet ink, or even trapped or contained within the structured network. For example, the present non-Newtonian inkjet inks can further comprise a polymeric surfactant that does not self-assemble as part of the three dimensional structure but can be present within such a structure.

Regarding the present description as it relates to "non-Newtonian," a non-Newtonian fluid is one which has viscosity dependent on an applied force such as shear or thermal forces (added thermal). For example, shear thinning fluids decrease in viscosity with increasing rate of shear. The inks of the present application can show these same shear thinning effects, under the fluid ejection conditions in which ink is moved between the fluid container and the printhead of an inkjet device. In another example, thermal thinning fluids decrease in viscosity with increasing rate of heat. The inks of the present application can likewise show these same thermal thinning effects, when the inks are heated during printing, e.g., at the fluid container or at the printhead of an inkjet device.

In another aspect that may not be intuitive, the colorants, e.g. dispersed pigments that may be even large and dense pigments, in such non-Newtonian liquids show little or no settling in the fluid container or printhead during the times when the ink is not moving through the system or when the ink is not heated. When little or no dynamic pressure is being applied to the ink to move it through the system or when no heat is being applied to the ink, the ink has a viscous consistency. However, when the normal amount of dynamic pressure (at least ~10,000 Pascals) is applied to the ink to move it through the inkjet system or when the ink is heated to 50° C. or more, the ink viscosity can change significantly, e.g. from 25 to 2 cps. Thus, when such inks are ejected at a high frequency from inkjet dispensing devices, the dynamic viscosities of the inks measured inside of the printhead do not interfere with the ejection process of the inkjet system. Generally, during the time when the ink is not moving or being heated, pigment or other particulate settling is either completely prevented or slowed down by several orders of magnitude.

The present non-Newtonian inkjet inks can also provide excellent ink efficiency independent on the media used. For example, the inks described herein can have improved optical densities across the paper set as compared to a current commercial ink. In one example, the optical density (in the case of a black ink) of the non-Newtonian inkjet ink can be increased by at least 5% over a comparative inkjet ink printed from the same inkjet printer on the same recording media with the same print coverage. In other aspects, the optical density can be increased by 10%, 15%, 20%, 30%, or even 50%. Such recording media can include both coated and uncoated recording media. As used herein, "comparative inkjet ink" refers to a Newtonian inkjet ink such as the one in commercially available in HP®970 Black ink cartridge.

As mentioned, the structured network comprises silica, alumina, and a charged colorant, such as a carbon black or other black or colored pigment. The silica can generally be present in the non-Newtonian inkjet ink in an amount ranging from 0.1% to 10% by weight based on the total weight of the non-Newtonian inkjet ink. In one example, the silica can be present in an amount at from 1% to 5% by weight, and in one aspect, at from 0.5% to 2% by weight, based on the total weight of the non-Newtonian inkjet ink. Additionally, the particle size of the silica can be varied depending on the desired properties of the non-Newtonian inkjet ink. In one example, the particle size can be from 15 nm to 100 nm, e.g., substantially spherical and/or colloidally synthesized. In another aspect, the particle size can be from 20 nm to 50 nm, or from 20 nm to 30 nm. In another example, the silica can be chain silica having a diameter from 10 nm to 50 nm and a length of 100 nm to 250 nm.

Generally, the structured network forms with the silica being in a presence of an alumina co-dispersed in a liquid phase (liquid vehicle which includes an organic solvent and typically water). As discussed herein, the alumina can generally be present in the non-Newtonian inkjet ink in an amount ranging from 0.25% to 5% by weight based on the total weight of the non-Newtonian inkjet ink. In one example, the alumina can be present in an amount of 0.5% to 4% by weight, and in one aspect, 0.75% to 2% by weight based on the total weight of the non-Newtonian inkjet ink.

The inclusion of alumina can contribute to the structure of the ink. With the alumina close to the point of zero charge (i.e. the isoelectric point of the alumina used), a strong attraction between particles can occur and the van der Waals interactions increase, thereby forming a strong attractive potential and can result in a structured network by providing elastic content to a predominantly fluidic system. As mentioned, these structured systems show non-Newtonian flow behavior, thus providing useful characteristics for implementation in an ink-jet ink because their ability to shear or thermal thin for jetting. Once jetted, this feature allows the jetted drops to become more elastic-, mass-, or gel-like when they strike the media surface. These characteristics can also provide improved media attributes such as colorant holdout on the surface.

Regarding the inks of the present disclosure (with or without colorant), the role of alumina can impact both the jettability and the response after jetting. When comparing two non-Newtonian inkjet inks (with or without alumina, but otherwise identical), the ink with alumina will typically have a higher viscosity over a range of shear rates. In one example, the alumina can be added such that its presence in this system is just enough to make an appreciable difference in the printing characteristics of the ink, but not so much that the ink becomes too low in viscosity. This amount can be determined by routine experimentation. For example, the alumina treated silica can be designed so that the ink can refill quickly and produce a higher quality print. Higher quality printing can be determined in one aspect by improved optical density (when a colorant is present in the ink). Typically, inks with the alumina can also have higher optical densities, while retaining good jettability properties and other properties, such as ink structure, rheological behavior, shear thinning, and jetting of ink drops. Furthermore, alumina can also contribute to the silica in the inks of the present disclosure having decreased restructuring time after shear or thermal thinning for printing. Higher pre-shear rates can often result in a likewise faster response in the presence of alumina. In these instances, a fast restructuring of the ink can mean more solid-like behavior on the media surface in less time with less fluid penetration, and thus better colorant holdout and greater ink efficiency.

The properties of the non-Newtonian inkjet ink, e.g., viscosity, optical density, ink efficiency, etc., can be affected by a number of variables including the type of the specific silica used (spherical, colloidally synthesized or grown, chain silica, etc.), the type of solvents, the amounts of these components, pH, ionic strength, etc. Regarding viscosity, as discussed herein, the viscosity for non-Newtonian fluids are not discrete but change based on the physical energy applied to the fluid. As used herein, "viscosity" refers to dynamic viscosity unless otherwise stated. For the present inks, the viscosity can generally be measured at two states: proximate in time to an at rest state; i.e., with a minimum shear applied to the ink (shear rate as low as $5\ s^{-1}$), and proximate in time to a processing state; i.e., with a significant shear applied to the ink (shear rate of $10,000\ s^{-1}$). In one example, the present inks can have a dynamic viscosity ranging from 25 cps to 2,000 cps at temperature of 25° C. and a shear rate of $5\ s^{-1}$ and a dynamic viscosity ranging from 1 cps to 20 cps at a shear rate of $10,000\ s^{-1}$. In another example, the present inks can have a dynamic viscosity of 25 cps to 1,000 cps at shear rate of $5\ s^{-1}$ and is 1 cps to 15 cps at a shear rate of shear rate of $10,000\ s^{-1}$. Additionally, in one example, the silica and the alumina can be present in a non-Newtonian inkjet ink at a silica to alumina ratio ranging from 0.5:1 to 5:1 by weight. In one aspect, the ratio can be from 2:1 to 3:1.

Generally, the present structured network is formed in a liquid phase containing an organic solvent. As used herein, "organic solvent" refers to any organic solvent or mixture thereof. As such, the term organic solvent includes systems of solvents. The present organic solvents are in addition to any water present in the non-Newtonian inkjet ink. Typical organic solvents that can be used include methanol, ethanol, propanol, iso-propanol, a glycol ether having at least about four carbon atoms, $C_{4-8}$ alcohols, 1-methoxy-2-propanol, 2-methoxy ethanol, 2-ethoxy ethanol, 1-methoxy-2-acetoxy propane, ethyl lactate, a glycol ether (optionally having at least about 10 carbon atoms), a dihydric alcohol (optionally having at least about 2 carbon atoms), tripropylene glycol monomethyl ether, tripropylene glycol-n-butyl ether, propylene glycol phenyl ether, 2-pyrrolidinone (2P), 1-(2-hydroxyethyl)-2-pyrrolidinone (2HE2P), glycerol polyoxyethyl ether (LEG-1), 1,3-bis(2-hydroxyethyl)-5,5-dimethylhydantoin (Dantocol® DHE), 2-methyl-1,3-propanediol (MPdiol), ethylhydroxy-propanediol (EHPD), glycerol, 1,5-pentanediol, 1,2-pentanediol, thiodiglycol, sulfolane, 1,3-dimethyl-2-imidazolidinone, caprolactam, ethylene glycol, diethylene glycol, triethylene glycol, tetraethylene glycol, propylene glycol, dipropylene glycol, tripropylene glycol, trimethylene glycol, butylene glycol, hexylene glycol, polyethylene glycol, polypropylene glycol, glycerol, 1,2,6-hexanetriol, ethylene glycol monomethyl ether, ethylene glycol monoethyl ether, diethylene glycol monomethyl ether, diethylene glycol monoethyl ether, diethylene glycol dimethyl ether, and mixtures thereof.

Additionally, organic solvents can be classified as network participating solvents and network non-participating solvents. As used herein, "network participating solvent" refers to organic solvents that increase viscosity of the non-Newtonian inkjet ink, measured at any functional shear rate. As used herein, "network non-participating solvent" refers to organic solvents that decrease the viscosity of the non-Newtonian inkjet ink, measured at any functional shear rate. As such, the present non-Newtonian inkjet inks can be altered based on the types of organic solvents used. For example, when the non-Newtonian inkjet ink comprises a network participating solvent, the structured network can be strengthened, e.g., the viscosity of the non-Newtonian inkjet ink can be increased. However, when a network non-participating solvent is used, the structured network can be weakened, e.g., the viscosity of the non-Newtonian inkjet ink can be decreased. In one example, network participating solvents can include ethylhydroxy-propanediol (EHPD), glycerol, 1,5 pentanediol, ethylene glycol, triethylene glycol, and mixtures thereof. In another example, network non-participating solvents can include 2-pyrrolidinone, 1,2-pentanediol, MPdiol, 1,2 hexanediol, sorbitol, 1-hyroxyethyl-2-pyrrolidone, sulfolane, and mixtures thereof. As such, the structured network properties and resultant non-Newtonian inkjet ink properties can be modified by mixing and matching particular organic solvents. In one example, the organic solvent comprises a mixture of a network participating solvent and a network non-participating solvent. Additionally, the present inks can contain a significant amount of organic solvent, including network participating solvents and/or network non-participating solvents. In one example, the organic solvent can be present in an amount ranging from 5% to 50% by weight based on the total weight of the non-Newtonian inkjet ink. In another aspect, the organic solvent can be present in an amount ranging from 20% to 40% by weight.

As discussed herein, the present inks can include a colorant. Such colorants can be colored pigments and/or dyes. In one example, the colorant is a pigment, and in one aspect, a dispersed pigment. Pigments can be any dispersed colorant generally used in the ink jet arts, including, but not limited to self-dispersed pigments that are dispersed by small molecules or polymers, etc., or dispersing agent dispersed pigments that are dispersed by the addition of a separate dispersing agent, e.g. a polymeric dispersing agent. In other examples, the colorant can be a dye, including one or more of the many water soluble dyes that are typically used in the inkjet arts. Examples include direct dyes, vat dyes, sulphur dyes, organic dyes, reactive dyes, disperse dyes, acid dyes, azo dyes, or basic dyes. In yet another example, the colorant can be a mixture of a pigment and a dye. In one example, the colorant can be present in the non-Newtonian inkjet ink at from 1% to 7% by weight based on the total weight of the non-Newtonian inkjet ink.

The present inks can be used in conjunction with multiple imaging systems, non-limiting examples of which include thermal or piezo inkjet, dye-sub, thermal transfer, electrostatic, liquid electrophotographic printing (LEP), etc. Additionally, the present inks can include water, and can further include non-ionic, cationic, and/or anionic surfactants, ranging from 0.01% by weight to 10% by weight. The present formulations can include other components, such as biocides, viscosity modifiers, materials for pH adjustment, sequestering agents, preservatives, and the like.

Silica and/or alumina can be dispersed with dispersants. Examples of suitable dispersants include, but are not limited to, water-soluble anionic species of low and high molecular weight such as phosphates and polyphosphates, phosphonates and polyphosphonates, phosphinates and polyphosphinates, carboxylates (such as citric acid or oleic acid), polycarboxylates (such as acrylates and methacrylates). Other examples include hydrolysable alkoxysilanes with alkoxy group attached to water-soluble (hydrophilic) moieties such as water-soluble polyether oligomer chains, phosphate group or carboxylic group. In some examples, the dispersant used to disperse silica and/or alumina particles can be a polyether alkoxysilane or polyether phosphate dispersant.

Examples of polyether alkoxysilane dispersants used to dispersed silica or alumina particles can be represented by the following general Formula (I):

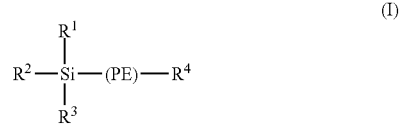

wherein:

a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be $—OCH_3$ and $—OCH_2CH_3$. In some examples, $R^1$, $R^2$ and $R^3$ are linear alkoxy groups having from 1 to 5 carbon atoms. In some other examples, $R^1$, $R^2$ and $R^3$ groups are $—OCH_3$ or $—OC_2H_5$.

b) PE is a polyether oligomer chain segment of the structural formula $[(CH_2)_n—CH(R)—O]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment ($—CH_2CH_2—O—$), or polypropylene glycol (PPG) chain segment ($—CH_2—CH(CH_3)—O—$), or a mixture of both types. In some examples, the polyether chain segment (PE) contains PEG units ($—CH_2CH_2—O—$); and c) $R^4$ is hydrogen, or a linear or a branched alkyl group. In some examples, $R^4$ is an alkyl group having from 1 to 5 carbon atoms.

Other examples of dispersants used to disperse the silica or alumina particles can include polyether alkoxysilane dispersants having the following general Formula (II):

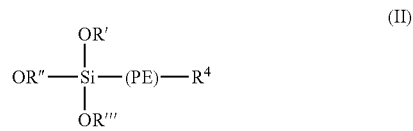

wherein R', R" and R'" are linear or branched alkyl groups. In some examples, R', R" and R'" are linear alkyl groups having from 1 to 3 carbon atoms in chain length. In some examples, R', R" and R'"—$CH_3$ or —$C_2H_5$. $R^4$ and PE are as described above for Formula (I); i.e. PE is a polyether oligomer chain segment of the structural formula: $[(CH_2)_n—CH—R—O]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the silica and/or alumina particles present in the ink composition are dispersed with polyether alkoxysilanes. Examples of suitable polyether alkoxysilanes include $(CH_3O)_3Si—(CH_2CH_2O)_{n'}$ H; $(CH_3CH_2O)_3Si—(CH_2CH_2O)_{n'}$,H; $(CH_3O)_3Si—(CH_2CH_2O)_{n'}$, $CH_3$; $(CH_3CH_2O)_3Si—(CH_2CH_2O)_{n'}$, $CH_3$; $(CH_3O)_3Si—(CH_2CH_2O)_{n'}$, $CH_2CH_3$; $(CH_3CH_2O)_3Si—(CH_2CH_2O)_{n'}$, $CH_2CH_3$; $(CH_3O)_3Si—(CH_2CH(CH_3)O)_{n'}$, H; $(CH_3CH_2O)_3Si—(CH_2CH(CH_3)O)_{n'}$, H; $(CH_3O)_3Si—(CH_2CH(CH_3)O)_{n'}$, $CH_3$; $(CH_3CH_2O)_3Si—(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, Silquest®A-1230 manufactured by Momentive Performance Materials and Dynasylan® 4144 manufactured by Evonik/Degussa.

The amount of dispersant used in the silica or alumina dispersion may vary from about 1% by weight to about 300% by weight of the silica and/or alumina particles content. In some examples, the dispersant content range is between about 2 to about 150% by weight of the silica and alumina particles content. In some other examples, the dispersant content range is between about 5 to about 100% by weight of the silica and/or alumina particles content. The dispersion of silica and/or alumina particles can be prepared via milling or dispersing silica and/or alumina powder in water in the presence of suitable dispersants.

The silica or alumina dispersion may be prepared by milling commercially available inorganic oxide pigment having large particle size (in the micron range) in the presence of the dispersants described above until the desired particle size is achieved. The starting dispersion to be milled can be an aqueous dispersion with solid content up to 40% by weight of the silica or alumina. The milling equipment that can be used is a bead mill, which is a wet grinding machine capable of using very fine beads having diameters of less than 1.0 mm (and, generally, less than 0.3 mm) as the grinding medium, for example, Ultra-Apex Bead Mills from Kotobuki Industries Co. Ltd. The milling duration, rotor speed, and/or temperature may be adjusted to achieve the dispersion particle size desired In addition to the non-Newtonian inkjet inks described herein, the present disclosure provides for inkjet print cartridges loaded with the inks described herein, as well as to a method of preparing the inkjet inks. For example, an inkjet print cartridge can be loaded with the non-Newtonian inkjet ink of the present disclosure. The inkjet print cartridge can be adapted for shearing the non-Newtonian inkjet ink within the printhead at a shear rate of 10,000 $s^{-1}$ or more to provide a dynamic viscosity ranging from 1 cps to 50 cps.

In another example, a method of manufacturing a non-Newtonian inkjet ink can comprise dispersing silica in an aqueous liquid vehicle; dispersing alumina in the aqueous liquid vehicle; and adding an organic solvent to the aqueous liquid vehicle. The non-Newtonian inkjet ink can be formed having a pH from 9 to 12 and a conductivity from 100 to 2000 μS/cm. The method can also comprise adding a colorant into the non-Newtonian inkjet ink. In one example, the inkjet ink can also be free of polymer. Furthermore, any of the properties described herein that relate to the non-Newtonian inkjet ink formulation are also relevant to this method.

Regarding method steps generally, such steps can be performed in a number of sequences and are not intended to be limited to require any particular sequence. For example, the adding of the organic solvent can be before mixing of the alumina, and vice versa. Additionally, it is noted that any and all combinations of such steps or individual step may be performed sequentially or simultaneously. For example, mixing of the alumina and the adding of the organic solvent may be performed sequentially or may be performed simultaneously.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is to be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

EXAMPLES

The following illustrates some examples of the present inks and methods that are presently known. However, it is to be understood that the following are only exemplary or illustrative of the application of the principles of the present disclosure. Numerous modifications and alternative examples may be devised by those skilled in the art without departing from the spirit and scope of the present compositions and methods. Thus, while the present inks and methods have been described above with particularity, the following examples provide further detail in connection with what are presently deemed to be the acceptable examples.

Example 1—Non-Newtonian Inkjet Inks

Multiple non-Newtonian inkjet inks (Black, Cyan, Magenta, and Yellow) were prepared using the general formulation of Table 1, as follows:

TABLE 1

Non-Newtonian Inkjet Inks

| Ingredient | Concentration |
| --- | --- |
| Silica Dispersion 30 nm ST-30HL from Nissan Chemical | 4 wt % solids |
| Alumina Dispersion 20-30 nm gamma alumina from US Research Nanomaterials Inc. treated with silyl coupling agent A1230 | 1 wt % solids |
| EHPD | 10 wt % |
| 2-pyrrolidinone | 10 wt % |
| Sorbitol | 10 wt % |

TABLE 1-continued

Non-Newtonian Inkjet Inks

| Ingredient | Concentration |
| --- | --- |
| 2-(N-cyclohexylamino)ethanesulfonic acid (CHES) | 0.2 wt % |
| Pigment | 3.0-4.0 wt %* |
| Water | Balance |
| pH | 10 |

*Cyan Ink was at 3.0 wt % pigment solids; and Black, Magenta, and Yellow Inks were at 3.5 wt % pigment solids.

Example 2—Newtonian Inkjet Inks

Comparative Newtonian inkjet inks were prepared with similar pigment loads, but without the alumina and silica, as set forth in Table 2:

TABLE 2

| Ingredient | Concentration |
| --- | --- |
| EHPD | 10 wt % |
| 2-pyrrolidinone | 10 wt % |
| Sorbitol | 10 wt % |
| 2-(N-cyclohexylamino)ethanesulfonic acid (CHES) | 0.2 wt % |
| Pigment | 3.0-3.5 wt %* |
| Water | Balance |

*Cyan in was at 3.0 wt % pigment solids; Black, magenta, and yellow inks were at 3.5 wt % pigment solids.

Example 3—Ink Stability

The black non-Newtonian inkjet ink prepared in accordance with Example 1 was loaded into an inkjet print cartridge and printed on two types of print media, HP® Recycled ColorLok® (International Paper Company) (HPRC) and Staples Copy Paper which is made for Staples (Staples Copy). Upon loading (week 0), the black ink was then printed on each type of media at multiple print densities ranging from 2% to 76%. Cartridges were also loaded and capped for shipping for a period of 6 weeks and 12 weeks, and at those intervals of storage time, the inkjet inks were printed at the same print densities. As can be seen in FIG. 1, the optical density at all print densities, at all time intervals, and on both types of media were very comparable indicating a very stable inkjet ink with respect to storage stability.

Example 4—Optical Density Comparative

Figure 2:
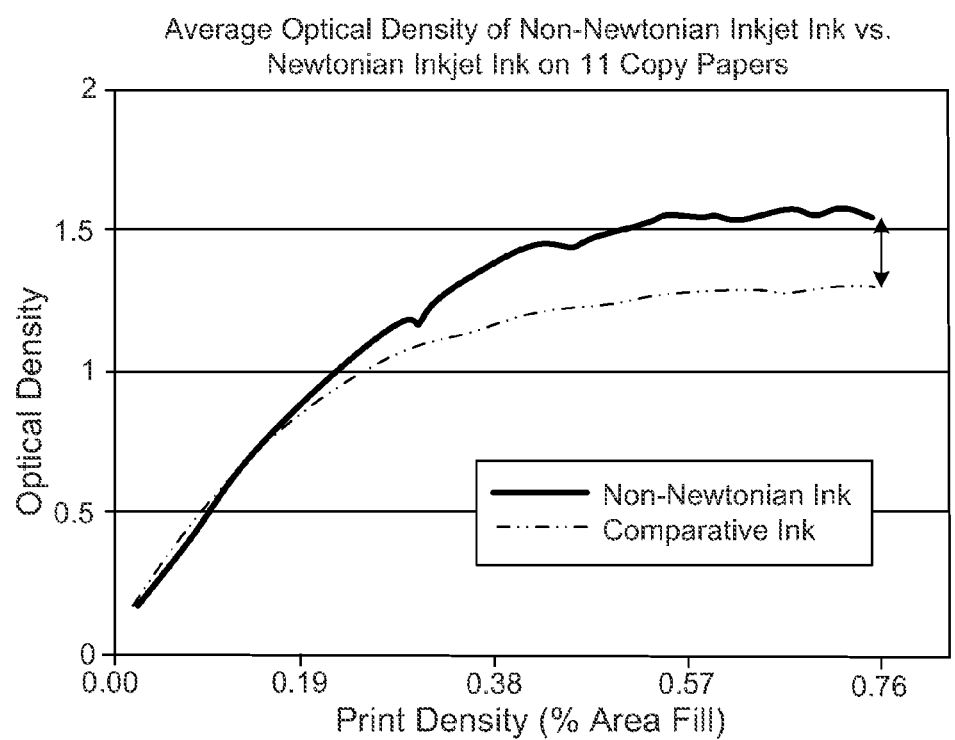
FIG. 2 is a graph comparing average optical density of a non-Newtonian ink compared to a comparative Newtonian ink on 11 different types of copy media in accordance with examples of the present disclosure.

The average optical density (OD) of two inks was measured on 11 different copy papers (non-ColorLok®) using a Greytag Macbeth Spectrolino spectrometer. One ink was a black non-Newtonian ink similar to the black ink in Example 1, except that the silica dispersion used was Snowtex PSM from Nissan Chemical. The second comparative ink was a Newtonian inkjet ink removed from an HP 970 black inkjet ink cartridge (commercially available from the Hewlett-Packard Company). As can be seen from FIG. 2, there was improved optical density versus print density from the non-Newtonian inkjet ink that included silica, alumina, and charged carbon black when printed on various copy papers as compared to the ink from the more traditional comparative ink.

Example 5—Color Saturation

Figure 3:
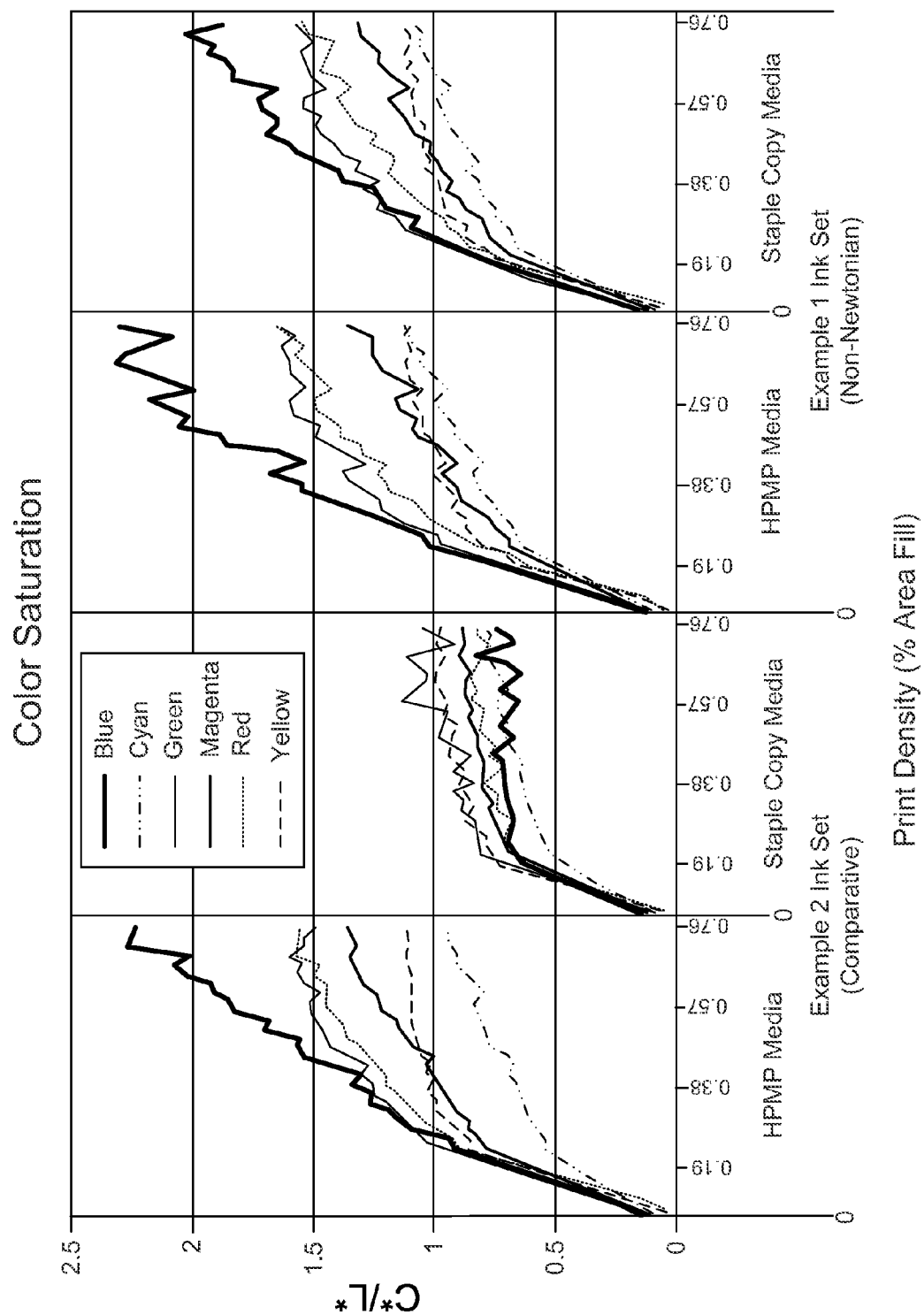
FIG. 3 is a graph comparing color saturation of a non-Newtonian ink set compared to a more traditional comparable ink set on two different types of media in accordance with examples of the present disclosure.

The color (non-black) non-Newtonian inkjet inks of Example 1 and the Newtonian comparative inkjet inks of Example 2 were filled in respective thermal inkjet ink pens (HP 940 inkjet cartridges commercially available from Hewlett-Packard Company). Ink patches were printed at 5 inches per second (ips) and the L*a*b* values on both HP® Multipurpose Paper—ColorLok® (International Paper Company) (HPMP) and Staples Copy Media were measured manually using a Greytag Macbeth Spectrolino spectrometer. The saturation (c*/L*) values on the HPMP and Staples Copy media were plotted for each color and for each ink as a function of print density. FIG. 3 summarizes the results. As can be seen, the optical density was generally improved on the HPMP media, and even more dramatic improvement was seen when printing on the Staples Copy media.

While the disclosure has been described with reference to certain examples, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A non-Newtonian inkjet ink, comprising:
silica in an amount ranging from 0.1% to 10% by weight based on the total weight of the non-Newtonian inkjet ink;
alumina in an amount from 0.25% to 5% by weight based on the total weight of the non-Newtonian inkjet ink; and
organic solvent in an amount from 5% to 50% by weight based on the total weight of the non-Newtonian inkjet ink,
wherein the non-Newtonian inkjet ink is an aqueous ink having a pH from 9 to 12 and a conductivity from 100 to 2000 μS/cm.

2. The non-Newtonian inkjet ink of claim 1, wherein the alumina has an isoelectric point at or below the pH of the non-Newtonian inkjet ink.

3. The non-Newtonian inkjet ink of claim 1, wherein the pH is from 9.5 to 11, and the ink has a conductivity from 500 to 1000 μS/cm.

4. The non-Newtonian inkjet ink of claim 1, wherein the silica is substantially spherical and colloidally synthesized, and has an average particle size ranging from 15 nm to 100 nm.

5. The non-Newtonian inkjet ink of claim 1, wherein the silica is chain silica with a diameter from 10 nm to 50 nm and a length of 100 nm to 250 nm.

6. The non-Newtonian inkjet ink of claim 1, wherein the alumina has an average particle size ranging from 5 nm to 50 nm.

7. The non-Newtonian inkjet ink of claim 1, further comprising a pigment colorant in an amount from 1% to 7% by weight based on the total weight of the non-Newtonian inkjet ink.

8. The non-Newtonian inkjet ink of claim 1, wherein the organic solvent is a network participating solvent selected from the group consisting of 2-ethyl-2-hydroxymethyl-1,3-propanediol, glycerol, 1,5-pentanediol, ethylene glycol, triethylene glycol, and mixtures thereof; or the organic solvent is a network non-participating solvent selected from the group consisting of 2-pyrrolidinone, 1,2-pentanediol, 2-methyl-1,3-propanediol, 1,2-hexanediol, sorbitol, 1-hyroxyethyl-2-pyrrolidone, sulfolane, and mixtures thereof.

9. The non-Newtonian inkjet ink of claim 1, wherein the organic solvent comprises only network participating solvent, or a mixture of network participating solvent and network non-participating solvent.

10. The non-Newtonian inkjet ink of claim 1, wherein the silica and the alumina are present at weight ratio ranging from 0.5:1 to 5:1.

11. The non-Newtonian inkjet ink of claim 1, wherein the silica forms a structured network in the presence of the alumina, and wherein the inkjet ink has a dynamic viscosity ranging from 25 cps to 10,000 cps at shear rate of 5 $s^{-1}$ and a dynamic viscosity ranging from 1 cps to 50 cps at a shear rate of 10,000 $s^{-1}$, measured at 25° C.

12. An inkjet print cartridge loaded with the non-Newtonian inkjet ink of claim 1, wherein the inkjet print cartridge is associated with a printhead adapted shearing the non-Newtonian inkjet ink at a shear rate of 10,000 $s^{-1}$ or more to provide a dynamic viscosity ranging from 1 cps to 50 cps.

13. A method of manufacturing a non-Newtonian inkjet ink, comprising:
   dispersing silica in an aqueous liquid vehicle;
   dispersing alumina in the aqueous liquid vehicle; and
   adding an organic solvent to the aqueous liquid vehicle,
      wherein the non-Newtonian inkjet ink is formed having a pH from 9 to 12 and a conductivity from 100 to 2000 µS/cm.

14. The method of claim 13, further comprising mixing a colorant into the non-Newtonian inkjet ink.

15. The method of claim 13, wherein the structured network is free of polymer.

* * * * *